United States Patent
Schubert

(10) Patent No.: US 8,888,463 B2
(45) Date of Patent: Nov. 18, 2014

(54) ROTOR BLADE AND METHOD FOR PRODUCING SAME

(75) Inventor: Matthias Schubert, Rendsburg (DE)

(73) Assignee: REpower Systems AG, Hamburg (DE)

( * ) Notice: Subject to any disclaimer, the term of this patent is extended or adjusted under 35 U.S.C. 154(b) by 908 days.

(21) Appl. No.: 13/120,454

(22) PCT Filed: Sep. 11, 2009

(86) PCT No.: PCT/DE2009/001271
§ 371 (c)(1),
(2), (4) Date: Jun. 30, 2011

(87) PCT Pub. No.: WO2010/034283
PCT Pub. Date: Apr. 1, 2010

(65) Prior Publication Data
US 2011/0262280 A1  Oct. 27, 2011

(30) Foreign Application Priority Data
Sep. 25, 2008 (DE) .......................... 10 2008 049 016

(51) Int. Cl.
| | |
|---|---|
| *F01D 5/18* | (2006.01) |
| *B29C 70/30* | (2006.01) |
| *F03D 1/06* | (2006.01) |
| *B29L 31/08* | (2006.01) |

(52) U.S. Cl.
CPC ........... *B29C 70/30* (2013.01); *B29L 2031/082* (2013.01); *F03D 1/0675* (2013.01); *F05B 2280/6003* (2013.01); *F05B 2250/292* (2013.01); *Y02E 10/721* (2013.01); *F05C 2253/04* (2013.01)

USPC .......................................... 416/226; 416/240

(58) Field of Classification Search
CPC ....... F03D 1/0675; F03D 3/061; F03D 3/062; F05B 2250/292; F05B 2280/6003; B29C 2031/08; B29C 2031/085
USPC .......... 416/223 R, 226, 227 R, 232, 233, 239, 416/240
See application file for complete search history.

(56) References Cited

U.S. PATENT DOCUMENTS

| | | | |
|---|---|---|---|
| 4,137,007 A | 1/1979 | Schonball | |
| 2005/0186081 A1* | 8/2005 | Mohamed | ..................... 416/226 |
| 2007/0189902 A1 | 8/2007 | Mohamed | |

FOREIGN PATENT DOCUMENTS

| | | |
|---|---|---|
| DE | 203 20 714 U1 | 1/2005 |
| JP | 2007 255366 | 10/2007 |
| WO | WO 03/008800 A1 | 1/2003 |

* cited by examiner

*Primary Examiner* — Dwayne J White
(74) *Attorney, Agent, or Firm* — Nash and Titus, LLC

(57) ABSTRACT

The invention relates to a rotor blade for wind energy installation, comprising at least one flange running in a longitudinal direction from a rotor blade root to a rotor blade tip, whereby a width of the flange decreases along the longitudinal direction. The invention also relates to a method for producing a rotor blade in that at least one flange with a width decreasing in the longitudinal direction is applied to a rotor blade inner wall, and to a laying assistance device for positioning strips of the flange.

17 Claims, 3 Drawing Sheets

ROTOR BLADE AND METHOD FOR PRODUCING SAME

BACKGROUND OF THE INVENTION

This invention is a Section 371 national application based on PCT international application PCT/DE2009/001271, filed Sep. 11, 2009, and also claims priority from German application DE 10 2008 049 016.4, filed Sep. 25, 2008, and the contents of both applications are incorporation herein in their entirety The invention relates to a rotor blade for a wind energy system with at least one flange running in a longitudinal direction from a rotor blade root to a rotor blade tip and to a method for producing the rotor blade. The invention also relates to a laying assistance device for positioning strips of the flange of the rotor blade.

Rotor blades are sufficiently known in the state of the art. The rotor blades of modern wind energy systems have lengths of 60 meters and more. The rotor blades can have diameters of several meters, in particular in the section of the rotor blade root. Rotor blades that are so long and substantially hollow have the problem of achieving sufficient resistance to bulges. In order to increase the buckling resistance of rotor blades, flanges are applied in the longitudinal direction on the inside along the inner wall of the rotor blade of the upper skin and of the lower skin. Furthermore, webs are mounted in the longitudinal direction projecting vertically from the flanges, that are preferably opposite each other in the inner space of the rotor blades. The flanges and webs are themselves endangered by bulges.

The flanges are customarily produced from positioning strips with a constant width in the laminating method. In this method the flanges can be constructed increasingly thinner from the rotor blade root toward the rotor blade tip by gradually ending positioning strips. This results in high flange thicknesses with a high buckling resistance at the rotor blade root and in the direction of the rotor blade tips the thickness of the flanges constantly decreases, as a result of which their buckling resistance also decreases.

In order to achieve a high effectiveness the flanges are constructed to be wide. However, this has the result that the flanges on the one hand cannot be placed into the outermost rotor blade tip and on the other hand much material is needed for the production of the flange strips.

SUMMARY OF THE INVENTION

The invention therefore has the problem of making a rotor blade available that has sufficient buckling resistance and can nevertheless be produced with lower cost for material. As regards the method, the invention has the problem of making available a production method for such a rotor blade and the invention has the problem of making available a laying assistance device for positioning strips of a flange.

As regards the rotor blade the problem is solved by an initially cited rotor blade with at least one flange whose width decreases in accordance with the invention along the longitudinal direction. As a result of the decrease in width in accordance with the invention the flange can extend far into the rotor blade tip and its production requires less material.

The flanges increase the buckling resistance of the rotor blade. Blades that are opposite one another in the inner space of the rotor blade are preferably permanently connected to one another by at least one web that preferably vertically projects from both flanges.

DETAILED DESCRIPTION OF CERTAIN OF THE EMBODIMENTS

Figure 1:
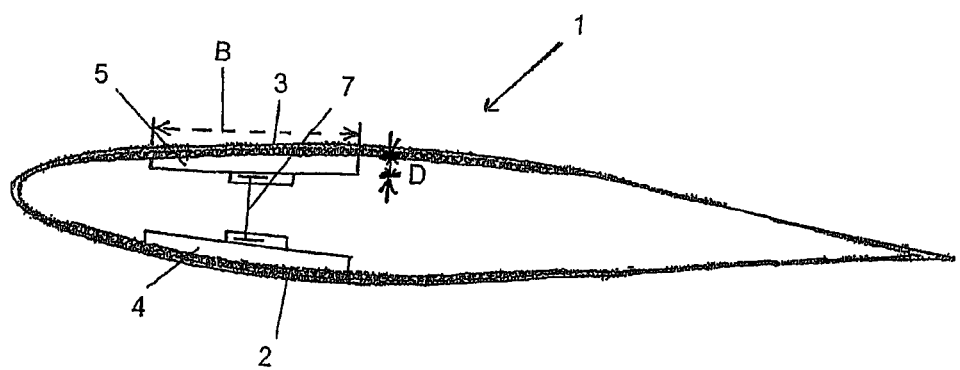
FIG. 1 shows a cross section of a traditional rotor blade in a first embodiment.

"Longitudinal direction" denotes here a direction from the rotor blade root toward the rotor blade tip. No distinction is made in the following between a longitudinal direction of the flange, of the rotor blade half skin or of the rotor blade. They should be considered here as coincident.

"The width of the flange" denotes in the following the extent of the flange transversely to the longitudinal direction, preferably vertically to the longitudinal direction. "Transverse direction" also denotes a direction transverse to the longitudinal direction, preferably vertically to the longitudinal direction.

Experience has shown that rotor blade blades area endangered by bulges in particular in the area of the rotor blade root. Therefore, in order to increase the buckling resistance, flanges which are especially wide along the inner rotor blade sections are necessary. "Outer" and "inner" denote here and in the following the position of the rotor blade section or of the particularly described structural component in reference to the wind energy system in the mounted state. That is, the outer rotor blade sections are arranged in the area of the rotor blade tip and the inner rotor blade sections are arranged in the area of the rotor blade root.

It is basically conceivable to allow the flange width to decrease in different manners in the direction of the rotor blade tip. The flange width preferably decreases stepwise. The increments are preferably transverse increments running in the transverse direction. The transverse increments can be distributed in the longitudinal direction over a rather long rotor blade section or flange section. The section can have a length corresponding to at least one half the rotor blade length. However, the transverse increments can also be distributed over 70%, 80% or more of the rotor blade length.

The at least one flange is preferably produced from superposed positioning strips in a laminating process. During the flange production a plurality of positioning strips are placed over each other starting from the rotor blade root. Positioning strips can be constructed differently among themselves. They can be tissue strips, glass fiber strips, with glass fibers aligned in the longitudinal direction or the like.

The length of the positioning strips can be different in the longitudinal direction so that positioning strips beginning in the same cross section at the rotor blade root end in different sections in the longitudinal direction of the rotor blade. In the particular sections the flange becomes stepwise thinner by the thickness of the positioning strip ending in the section. In this manner the flange can be reduced in its flange thickness in several increments along its longitudinal direction. All positioning strips preferably begin in the same cross section at the rotor blade root. According to the invention the positioning strips should be designed to be smaller in their width the further they are in the longitudinal direction from the rotor blade root. Basically, different positioning strips can even begin at different distances from the rotor blade root and run from there in the longitudinal direction.

Outside positioning strips of a flange are preferably shorter than inside positioning strips of the flange. "Outside" and "inside" denote here and in the following directions along the cross section of the rotor blade. "Outside" indicates a direction toward the rotor blade wall and "inside" a direction into the inner space of the rotor blade.

Therefore, outside positioning strips run at first starting from the rotor blade root and the inside positioning strips run past transverse increments produced by the ending of the outside positioning strips in the direction of the rotor blade tip. Transverse increments preferably run in a straight line in the transverse direction.

Each positioning strip adjacent on the inside to an outside positioning strip is advantageously longer than the outside positioning strip in the direction of the inner space of the rotor blade. In this preferred embodiment of the invention the outside positioning strips end successively in the direction of the rotor blade tip and form a transverse increment at each ending over which increment the inside positioning strips are run.

The described embodiments of the invention make it possible to also make the flanges thinner from the rotor blade root toward the rotor blade tip.

The flange width preferably continuously decreases in the longitudinal direction. In this regard it is conceivable to taper the individual, superposed positioning strips conically toward the rotor blade tip so that the entire flange tapers toward the rotor blade tip.

In a preferred further development of the invention the positioning strips differ from each other in their width. Individual positioning strips or all positioning strips can have a uniform width over their particular longitudinal extent. Preferably, the widest positioning strips end first, starting from the rotor blade root in the direction of the rotor blade tip, whereas narrower positioning strips end at positions of the rotor blade which positions are further removed in the longitudinal direction. As a result of this forming of the positioning strips it is possible to allow the entire flange to become narrower in the longitudinal direction. The flange width decreases incrementally, whereby the incremental decrease in width takes place in the same particular cross section in which an associated transverse increment produced by the ending of the positioning strip runs.

All positioning strips preferably and advantageously have a constant width along their entire longitudinal extent. However, it is also conceivable that the width of the positioning strip itself varies, in particular that it decreases in the longitudinal direction. However, the reduction of the width of the flange is preferably achieved by layering positioning strips with a different length and width, whereby each individual positioning strip has a constant width along its longitudinal extent.

Outside positioning strips are preferably wider than inside positioning strips of the flange. In an especially preferred embodiment of the invention each positioning strip adjacent on the inside to an outside positioning strip is narrower than the outside positioning strip. In this embodiment the flange assumes a shape that is pyramidal in cross section.

Due to the different width of the positioning strips, longitudinal increments form between the positioning strips in the longitudinal direction. The longitudinal increments have an increment height corresponding to the thickness of the narrower, inside positioning strip. In order to smooth the longitudinal increments, closures running in a wedge-like shape in the longitudinal direction can be formed in the longitudinal increment. These closures can be wedge-shaped balsa wood strips or balsa wood pieces that are placed laterally against the inside, narrower positioning strip and are adhered or laminated onto the outside, broader positioning strip.

The smoothing can be carried out for each of the longitudinal increments. Laminating the positioning strips, including the longitudinally running wedges, over each other produces a main flange with a largely level and straight inner surface that can serve as a straight step surface for maintenance work. In addition, the width and the thickness of the individual positioning strips are adapted to the curvature of the cross section of the rotor blade, so that the positioning strips all laterally end in the step surface plane.

In a further preferred embodiment of the invention the transverse increments are smoothed by transversely running closures which are also wedge-shaped.

The transverse increments have the particular problem that the inside positioning strips could only be moved onto the adjacent, outside positioning strips by forming hollow spaces above the transverse increment. The flange would be exposed to an elevated danger of buckling in the sections of the transverse increments. According to the invention the hollow spaces in front of the transverse increments are filled out by transversely running closure pieces.

The positioning strips preferably end in the longitudinal direction in a straight edge in the transverse direction. Thus, the edge forms a straight transverse increment. The transverse increment is smoothed in accordance with the invention by preferably one transversely running closure piece in the form of a wedge piece. The transversely running wedge pieces are preferably more pointed than the longitudinally running wedge pieces. The transversely running wedge piece is accurately formed into the associated transverse increment. It is adapted to the terminated, outside positioning strip and transfers an inner surface of the positioning strip at a slant with a very slight rise of preferably a few degrees constantly onto an inner side of the adjacent, outside positioning strip or onto the inner wall of the rotor blade half skin.

The adjacent, inside positioning strip can be run over the transverse increment smoothed in this manner without the positioning strip being exposed to an elevated danger of buckling.

The wedge-shaped, transversely running closure pieces are also preferably formed from balsa wood. Balsa wood can be readily processed and can be firmly bound into the laminated layers in a lamination process.

However, the longitudinally and/or transversely running closure pieces can have very different forms, in particular a wedge-shaped cross-section can change in its side length and/or angles along the particular longitudinal extension of the closure piece.

It is possible, in combination with the previously described embodiment for first ending outside positioning strips in the longitudinal direction, to allow the flanges to become successively narrower and thinner at the same time.

The term flange can denote a main flange but also a secondary flange. The invention can also be used with main flanges and secondary flanges of the same rotor blade.

As regards the method, the problem is solved in that a flange with a width that decreases in the longitudinal direction is applied on an inner wall of a rotor blade.

The method can also be used with main flanges and/or secondary flanges.

Positioning strips with different widths and lengths are preferably layered above each other. The positioning strips with different lengths are selected in such a manner that the longer the positioning strips are, starting from the rotor blade root in the longitudinal direction, the smaller their average, preferably constant width is selected to be. The layer sequence can be selected as desired in order to achieve a decrease in width of the associated flange.

At first, positioning strips which are short and wide on the outside are advantageously placed on the inside wall of the rotor blade half skin and positioning strips which are narrower and longer on the inside are placed on them until the complete layer construction is achieved. The positioning strips are then laminated over.

Preferably, successively short, wide positioning strips are placed on the outside, preferably on the rotor blade wall, and adjacently on the inside longer and narrower positioning strips are placed on the outside positioning strip. However, it is also conceivable that successively following positioning strips do not necessarily become longer and longer and narrower and narrower but rather it is also possible that inside positioning strips are shorter than adjacent outside positioning strips or inside positioning strips are wider than adjacent outside positioning strips. However, the widest positioning strips in the longitudinal direction should be ended first and the next widest positioning strips ended secondly, and so forth, so that in the end only one positioning strip or a few positioning strips with the narrowest width remain in the rotor blade tip. For the rest, it is also conceivable that several positioning strips have the same length and/or width and can be used to produce the rotor blade.

In a preferred embodiment of the invention the ends of the positioning strips ending in the longitudinal direction form transverse increments on which wedge-shaped connection pieces are placed and on the inside an adjacent positioning strip can be placed over the terminated positioning strips and the wedge-shaped closure piece.

In this preferred embodiment of the invention a wide positioning strip is terminated, preferably in a straight line vertical to the longitudinal direction, and a transversely running closure is formed on the increment being formed by the termination of the positioning strip, which closure continuously transfers the positioning strip plane onto the positioning strip that is adjacent on the outside. In the subsequent laminating procedure the outside positioning strip and the closure are laminated over and therefore firmly bound into the flange coating.

It is advantageous if preferably lateral longitudinal increments formed on the flange in the longitudinal direction by the different width of the individual positioning strips are smoothed by connections running in the longitudinal direction. The lateral connections can extend over the entire length of the positioning strip that is arranged at the same height.

Even the lateral connections running in the longitudinal direction are laminated over with the positioning strips in the lamination process.

The connection pieces running in the transverse direction and those running in the longitudinal direction can be formed wedge-shaped in a cross section. They can comprise balsa wood or consist completely of it. The rise of the lateral connection pieces as well as the width of the positioning strips is preferably selected in such a manner that the laminated-over flange in the inner space of the rotor blade form a surface that is as level and straight as possible.

The main and/or secondary flanges produced in accordance with the invention are no longer equally wide in cross section in every position but rather the flanges are narrower in cross section in the middle area in the cross section at their outer ends. As a result, on the one hand material is saved and the buckling resistance of the flanges nevertheless remains sufficiently high since the load on the belts is in any case less on the lateral edges than in the middle area.

The problem is solved in its third aspect by a laying assistance device for positioning strips of a flange of a rotor blade half skin of a rotor blade of a wind energy system with a stop for positioning strips and with a holding device with which the stop remains fixed in this position opposite the positioning strip to be laid during the laying, and with a height adjustment apparatus and with a width adjustment apparatus of the stop vis-à-vis the rotor blade.

The laying assistance device comprises a stop extending preferably completely over the longitudinal extension of the rotor blade or of the rotor blade half skin. Rotor blades are preferably produced in such a manner that at first two rotor blade half skins are formed in production molds. The flanges can be laminated into the rotor blade half skins. However, it is also conceivable that flange web groups are laminated into the rotor blade half skins. Since the flange in accordance with the invention can have several positioning strips that are different in their width, it is necessary to lay the positioning strips in the longitudinal direction in such a manner that their lateral relative offset remains constant in the longitudinal direction. To this end the stop of the laying assistance device can be arranged fixed in its position relative to the rotor blade half skin and to the positioning strips to be laid in it, and the associated position strip is laid flush with its side along the stop.

In order that the laying assistance device can also be used to lay further positioning strips that are narrower and/or wider and are arranged further inside or further outside, the stop is adjustable preferably in its height relative to the rotor blade wall or the width in the transverse direction. Thus, the stop can also be used by increasing the height relative to the rotor blade wall for positioning strips arranged further inside, and by adjusting the stop in the transverse direction by a wide adjustment apparatus the stop can also be used for narrow or rather wide positioning strips.

The laying assistance device can also comprise a stop that is shorter in the longitudinal direction. The laying assistance device then preferably comprises in addition a moving apparatus in the longitudinal direction.

In an especially preferred embodiment of the laying assistance device the holding device is designed as a bracket that on the one hand is firmly connected to the stop and on the other hand is pivotably connected to a production mold for this rotor blade half skin. As a result thereof, it is possible, for example, to first produce the rotor blade half skin in a lamination process, then to pivot the stop by means of the bracket into the rotor blade half skin and in the following steps to place positioning strips of the main flange and/or of the secondary flange onto the inner wall of the rotor blade half skin with the aid of the laying assistance device and then to laminate over them.

The laying assistance device advantageously has a foot with which the stop pivoted into the rotor blade skin can be supported on the inner wall of the rotor blade half skin. The height adjustment device advantageously comprises an extraction device for the at least one foot.

The invention is described using exemplary embodiments in six figures. The figures show the invention in schematic fashion. Many embodiments are conceivable. The drawings shown in the figures are neither true to size nor true to scale.

The cross section of a traditional rotor blade 1 shown in FIG. 1 shows a substantially hollow inner space of a rotor blade formed by joining together a lower rotor blade half skin 2 and an upper rotor blade half skin 3. During the production method of rotor blade 1 the rotor blade half skins 2, 3 are at first produce separately in a lamination method. To this end each of the two rotor blade half skins 2, 3 is provided with its own production mold in which the associated rotor blade half skin 2, 3 is formed, preferably by placing positioning strips over each other and laminating over the superposed positioning strips. In particular, vacuum infusion can be used as the lamination method.

Rotor blades 1 of modern wind energy systems can have lengths of 60 meters or more. Even the manufacturing molds used to produce rotor blade half skins 2, 3 are correspondingly large. Each of the two rotor blade half skins 2, 3 can be manufactured in one piece by lamination in that positioning strips are laid out over the entire rotor blade length in the manufacturing mold. However, it is also conceivable to at first manufacture sections of rotor blade half skins 2, 3 and to subsequently join them to each other by lamination techniques.

Flanges 4, 5 are laminated into rotor blade half skins 2, 3 onto the inner wall of each of rotor blade half skin during the manufacturing process. Lower main flange 4 and upper main flange 5 preferably run in a straight line in longitudinal direction L of associated rotor blade half skin 2, 3. Flanges 4, 5 shown in FIG. 1 are so-called main flanges 4, 5 that are preferably arranged in the most bulgy area of the rotor blade cross section. Both main flanges 4, 5 are located opposite one another in the inner space of the rotor blade and are connected to one another in a load-resistant and permanent manner by a web 7 projecting vertically from each of the two main flanges 4, 5. Web 7 shown in FIG. 1 is a double-T web.

Web 7 itself can also be produced in a laminating method from positioning strips. On the one hand it is possible during the manufacture of a rotor blade half skin 2, 3 to laminate double-T web 7 onto lower half flange 4 laminated into lower rotor blade half skin 2, and on the other hand it is conceivable to separately manufacture lower half flange 4 together with double-T web 7 and to laminate lower main flange with double-T web 7 as a structural group subsequently onto the inner wall of lower rotor blade half skin 2.

The two main flanges shown in FIG. 1, lower main branch 4 and upper main flange 5, that are laminated on in the particular lower rotor blade half skin 2 and upper rotor blade half skin 3 have the same flange width B over their entire longitudinal extent in longitudinal direction L of rotor blade 1. However, a flange thickness D—in FIG. 1 it is the vertical extension of the lower end of the lower and upper main flange 4, 5 from rotor blade root 11—decreases starting in the direction of a rotor blade tip 1 in longitudinal direction L of rotor blade 1. The decrease of flange thickness D does not necessarily have to take place continuously over the entire longitudinal extent but rather thickened areas of main flanges 4, 5 can be provided in the rotor blade section. The decrease of flange thickness D in longitudinal direction L of rotor blade 1 is to be understood as an average decrease.

Usually, main flanges 4, 5 are produced by superposing several positioning strips. The outermost positioning strip, i.e., the positioning strip that is placed directly on the inner wall of lower rotor blade half skin 2, 3, extends from the outer edge of rotor blade root 11 in longitudinal direction L to rotor blade tip 12. "Inner" and "outer" denote here positional data of rotor blade sections or components relative to the position of the mounted rotor blade on the wind energy system. Inner rotor blade sections are accordingly rotor blade sections adjacent to rotor blade root 11 and outer rotor blade sections are adjacent to rotor blade tip 12.

The positioning strips run successively outward, starting from rotor blade root 11, starting from the innermost positioning strip. "Inside" and "outside" denote in the following the reference to the inner space of the rotor blade and the outer wall of the rotor blade. The positioning strip of the two metal strips 4, 5, which strip is furthest on the inside, runs starting from rotor blade root 11 outward as the first one, the second positioning strip runs out as the second one and so forth, while the positioning strip that is the furthest on the outside is designed almost up to into outermost rotor blade tip 12. Thus, thickness D of the lower and of the upper main flange 4, 5 decreases starting from rotor blade root 11 to rotor blade tip 13, whereby, however, the width B remains the same along the longitudinal extent of flanges 4, 5.

In order to achieve an especially good effectiveness of main flanges 4, 5, main flanges 4, 5 are constructed to be as wide as possible.

Figure 2:
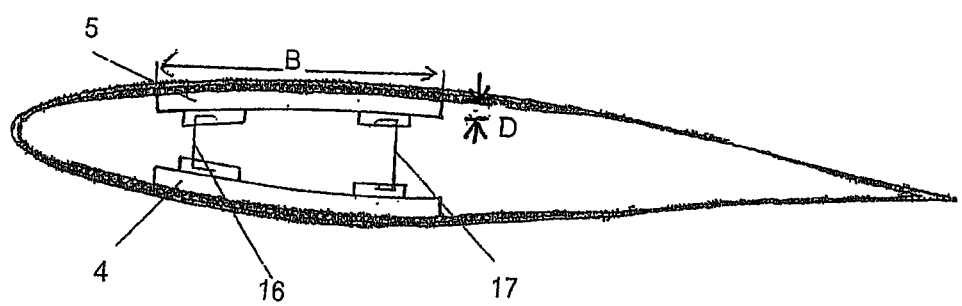
FIG. 2 shows a cross section of a traditional rotor blade in a second embodiment.

In a second traditional embodiment of a cross section of a rotor blade 1 the two main flanges 4 5 are connected to one another in a positionally fixed and permanent manner by two U-profile webs 16, 17. Otherwise, the method of manufacture as well as the main construction of flanges 4, 5 and webs 7, 16, 17 in FIG. 1 and FIG. 2 are the same.

The traditional upper and lower main frames 4, 5 in FIG. 1 have the disadvantage that the width B of the two main flanges 4, 5 is constant along main frames 4, 5. There is the danger in main frames 4, 5 in FIG. 2 that the two main frames 4, 5 are especially endangered by bulges in the central cross section. In the outer rotor blade sections the main flanges 4, 5 are also especially thin and there is in particular the increased danger here that they bulge out between the two U-profile webs 16, 17.

Figure 3:
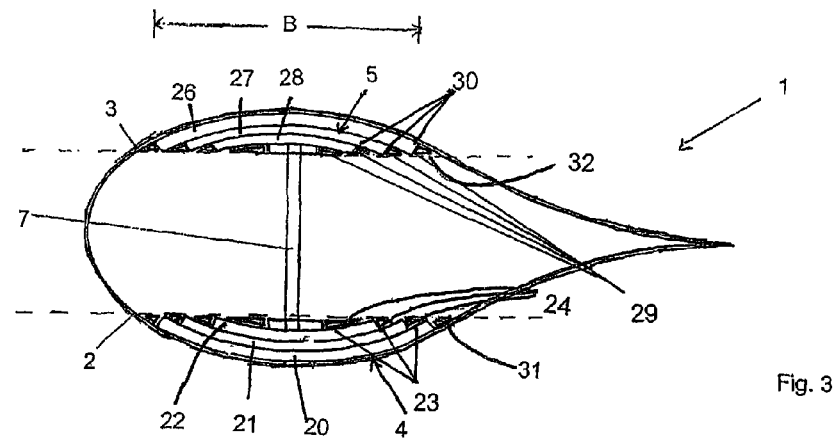
FIG. 3 shows a cross section of a rotor blade in accordance with the invention.

FIG. 3 shows the cross section of a rotor blade 1 in accordance with the invention. Rotor blade 1 is shown much more bulged than it is in reality. The cross section of rotor blade 1 in accordance with the invention also corresponds substantially to the rotor blade cross sections shown in FIG. 1, 2. The upper and the lower main flanges 4, 5 are furthermore laminated, as is known from the state of the art, onto upper and lower rotor blade half skins 2, 3. Each of the two main flanges 4, 5 consists of superposed positioning strips 20, 21, 22, 26, 27, 28. However, the positioning strips 20, 21, 22, 26, 27, 28 differ in their particular width B, that is, in their particular extension in the transverse direction of rotor blade 1. The outside upper and lower 20, 26 positioning strips are wide whereas the inside upper and lower positioning strips 22, 28 are narrower than the outside upper and lower 20, 26 positioning strips. FIG. 3 shows lower and upper main flanges 4, 5 constructed by three lower positioning strips 20, 21, 22 respectively three upper positioning strips 26, 27, 28. Lower and upper positioning strips 20, 21, 22 and 26, 27, 28 continuously decrease in their width from outside positioning strips 20, 26 to inside positioning strips 22 and 28. However, it is also conceivable to construct in particular successively following positioning strips equally wide.

The areas of the two main flanges 4, 5, which areas are the central ones in the transverse direction, are connected to each other by a double-T web 7.

Increments are produced in the transverse direction between the individual successive positioning strips. The increments can be smoothed by laterally placing beveled strips of balsa wood (not sketched in), preferably balsa wood strips extending in longitudinal direction L. As a result of the bulging construction of the two rotor blade half skins 2, 3, in this manner a level, readily accessible area 31, 32 through the inside walls of the two main flanges 4, 5 can be constructed in this manner in the inner space of the two rotor blade half skins 2, 3. The level construction of the inside walls is represented in FIG. 3 by two dotted lines.

Figure 4:
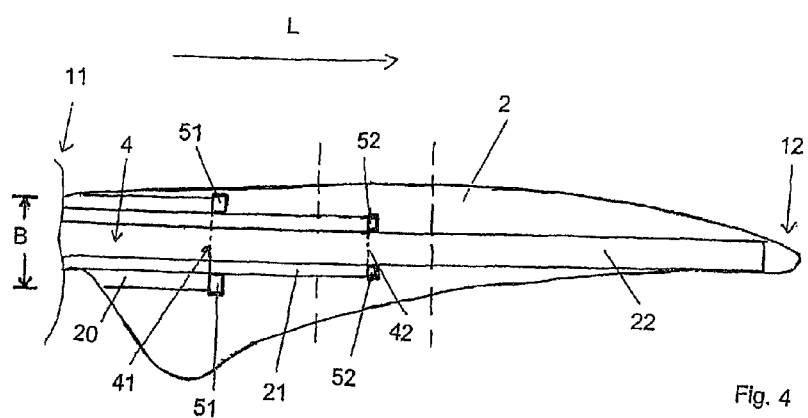
FIG. 4 shows a top view onto a lower half skin of a rotor blade in accordance with the invention.

FIG. 4 shows lower rotor half skin 2 in FIG. 3 in a top view. Upper rotor half skin 3 is removed. FIG. 4 shows that lower main flange 4 becomes narrower from rotor blade root 11 toward rotor blade tip 13 in FIG. 4 by increments 41, 42 in longitudinal direction L of rotor blade half skin 2. Basically, however, a plurality of increments 41, 42 are conceivable in longitudinal direction L that correspond to the number, decreased by one, of positioning strips 20, 21, 22 of lower main flange 4. FIG. 4 shows the positioning strip 20 that is on the innermost side and that is constructed to be the shortest in longitudinal direction L and the widest in the transverse direction in comparison to the other positioning strips 21, 22 of lowest flange 4.

FIG. 4 shows middle positioning strip 21, that runs in longitudinal direction L to approximately the middle of rotor blade half skin 2, ends there and is arranged regarding width B between positioning strip 20 furthest on the inside and positioning strip 22 furthest on the outside. Positioning strip 22 furthest on the inside is the narrowest of lower positioning strips 20, 21, 22 and extends from rotor blade root 11 almost completely into rotor blade tip 13. FIG. 4 shows that increments 41, 42 can also be beveled in longitudinal direction L by balsa wood pieces 51, 52. Main flange 4 is especially endangered by bulges in the section of both increments 41, 42. Outer increment is shown once again in FIG. 5 in a perspective view.

Only two positioning strips 21, 22 are still present in the section of outer increment 42. Outer increment 42 is formed by ending middle, lower positioning strip 21 and lowering positioning strip 22 furthest on the inside toward the inner wall of the rotor blade. Lower main flange 4 comprises three positioning strips 20, 21, 22. Lower outside positioning strip 20 is the widest and the shortest of the three positioning strips 20, 21, 22. A lower central positioning strip 21 is narrower and longer than lower outside positioning strip 20 but wider and shorter than inside, lower positioning strip 22.

Figure 5:
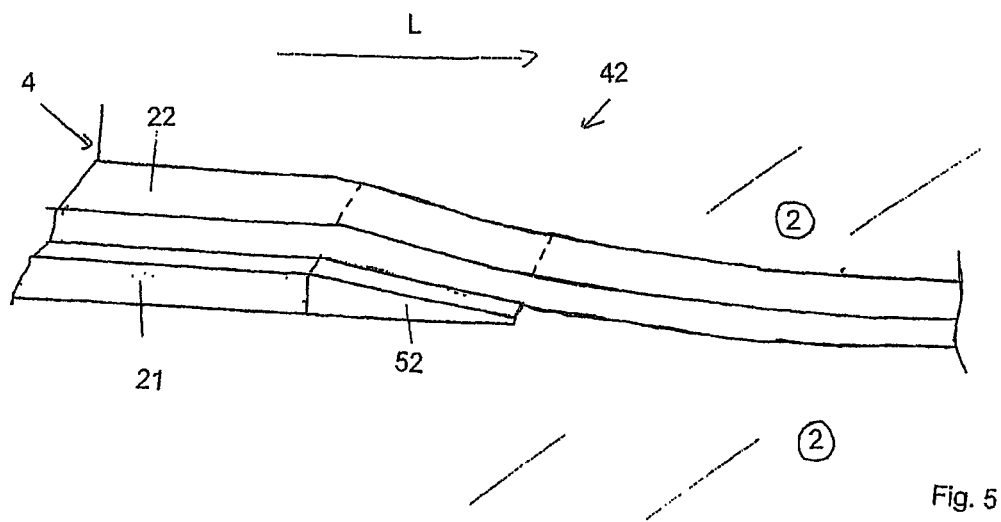
FIG. 5 shows a perspective view of the increment in FIG. 4.

Because the central positioning strip 21 ends in a rotor blade section and forms an increment 42 by the ending, inside positioning strip 22 must be run over increment 42. This inside positioning strip 22 is endangered by bulges in the section of increment 42. FIG. 5 shows that inside positioning strip 22 is lowered onto the inner wall of rotor blade half skin 2 by a beveled balsa wood wedge 52 without a bend and under complete contact with the inside surface of balsa wood wedge 52. Balsa wood wedge 52 advantageously projects laterally over width B of inside positioning strip 22, thus also closing off the end of central positioning strip 21, and guides central positioning strip 21 smoothly to the inner wall of rotary blade half skin 2.

Figure 6:
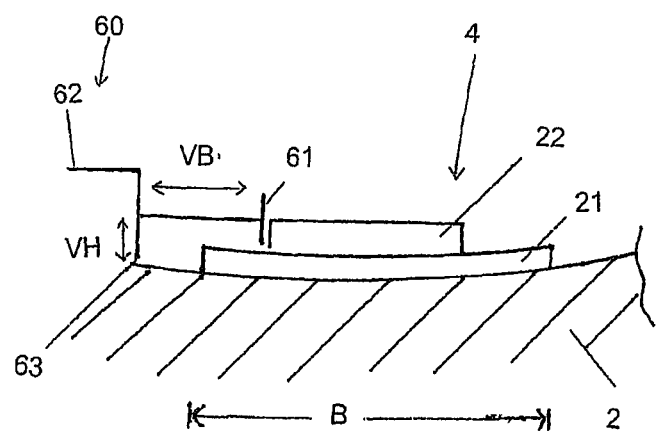
FIG. 6 shows a laying assistance device with an adjustable stop.

FIG. 6 shows a laying assistance device 60 with a stop 61 adjustable in width and height. Laying assistance device 60 is a tool with which positioning strips 21, 22 can be applied during the manufacturing process of lower main flange 4 onto the rotor blade inner walls of lower rotor blade half skin 2. Laying assistance device 60 can be used for laying all positioning strips 20, 21, 22 of lower main flange 4 as well as of upper main flange 5. The use with all positioning strips of any secondary flanges is also possible.

The individual positioning strips 21, 22 must be laid so that they remain equal and straight over several meters in longitudinal direction L in their offset to the edges of the already placed positioning strips 21, 22. This type of laying is made possible by basically shown laying assistance device 60. Stop 61 can extend over the entire longitudinal extent of rotor blade half skin 2 and be pivotably arranged, for example, via a bracket 62 on the edge or articulation of the manufacturing mold of rotor blade half skin 2. After the manufacture of the actual rotor blade half skin 2, laying assistance device 60 can be pivoted on bracket 62 into rotor blade half skin 2 up to feet 63 on the inner wall of rotor blade half skin 2, which feet are arranged in longitudinal direction L along laying assistance device 60. The height of stop 61 above rotor blade half skin 2 can be adjusted by a height adjustment apparatus VH, e.g., in that feet 63 can be drawn out relative to arms on which stop 61 is arranged. Stop 61 of laying assistance device 60 can be adjusted in its width by a width adjustment apparatus VB in order to be able to take into consideration the different track width B of positioning strips 21, 22.

LIST OF REFERENCE NUMERALS 1 rotor blade
2 lower rotor blade half skin
3 upper rotor blade half skin
4 lower main flange
5 upper main flange
7 web
11 rotor blade root
12 rotor blade tip
16 U-profile web
17 U-profile web
20 positioning strip
21 positioning strip
22 positioning strip
23 longitudinal increment
24 longitudinally running balsa wood wedge
26 positioning strip
27 positioning strip
28 positioning strip
29 longitudinal increment
30 longitudinally running balsa wood wedge
31 accessible surface
32 accessible surface
41 transverse increment
42 transverse increment
51 transversely running balsa wood wedge
52 transversely running balsa wood wedge
60 laying assistance device
61 stop
62 bracket
63 feet
B flange width, track width of the positioning position
D flange thickness
VH height adjustment apparatus of the stop
VB width adjustment apparatus of the stop
L longitudinal direction

The invention claimed is:

1. A rotor blade for a wind energy system with at least one flange running in a longitudinal direction (L) of the rotor blade, characterized in that a width (B) of the flange decreases along the longitudinal direction (L), and that the at least one flange has superposed and differently wide positioning strips with different lengths in the longitudinal direction (L), and that the positioning strips are designed narrower in their width the further they are removed in the longitudinal direction (L) from the rotor blade root.

2. The rotor blade according to claim 1, characterized in that the width of the at least one flange gradually decreases in the longitudinal direction.

3. The rotor blade according to claim 1, characterized in that outside positioning strips of the at least one flange are shorter than positioning strips of the flange which are arranged inside the outside positioning strips.

4. The rotor blade according to claim 1, characterized in that each positioning strip adjacent on the inside of an outside positioning strip is longer than the outside positioning strip.

5. The rotor blade according to claim 1, characterized in that positioning strips arranged on the inside of an outside positioning strip of the at least one flange are narrower than the outside positioning strip of the flange.

6. The rotor blade according to claim 5, characterized in that positioning strips arranged on the inside of an outside positioning strip of the at least one flange are narrower sectionally or narrower substantially over their entire extent in the longitudinal direction (L) than the outside positioning strip of the flange.

7. The rotor blade according to claim 1, characterized in that a transversely running end of a positioning strip ended in the longitudinal direction forms a transverse increment into which a smoothing, transversely running closure is formed.

8. The rotor blade according to claim 7, characterized in that the transversely running end of a positioning strip ended in the longitudinal direction forms a transverse increment into which a smoothing, transversely running, wedge-shaped closure is formed that corresponds to the height and/or width of the ended positioning strip.

9. The rotor blade according to claim 1, characterized in that a longitudinally running end of a positioning strip ended in a transverse direction forms a longitudinal increment into which a smoothing closure running in the longitudinal direction (L) and is formed.

10. The rotor blade according to claim 9, characterized in that a longitudinally running end of a positioning strip ended in a transverse direction forms a longitudinal increment into which a smoothing closure running in the longitudinal direction (L) and formed like a wedge is formed that corresponds to the height and/or width of the ended positioning strip.

11. The rotor blade according to claim 9, characterized in that the closure running in the longitudinal direction (L) and/or the transversely running closure comprises balsa wood.

12. The rotor blade according to claim 1, characterized in that each positioning strip adjacent on the outside to an inside positioning strip is wider and shorter than the inside positioning strip.

13. A process for producing a rotor blade according to claim 1, in which at least one flange with its width (B) decreasing in the longitudinal direction (L) is applied onto a rotor blade inner wall, characterized in that the positioning strips with different widths (B) and/or different lengths are superposed over each other and selected in such a manner that the longer the positioning strips extend in the longitudinal direction (L) the narrower the positioning strips become.

14. The process according to claim 13, characterized in that the ends of the positioning strips ending in the longitudinal direction form transverse increments onto which transversely running closures are attached and that are smoothed, and/or that ends of the positioning strips ended in the transverse direction form longitudinal increments on which smooth closures running in the longitudinal direction (L) are attached.

15. The process according to claim 14, characterized in that smooth closures running in the longitudinal direction (L) are laminated.

16. The process according to claim 14, characterized in that smooth closures are balsa wood wedges.

17. The process according to claim 13, characterized in that the inside positioning strips are selected to be narrower than adjacent outside positioning strips and that the decrease in width is determined in such a manner that a substantially level and straight inside flange surface is formed, adaptive to a curvature of the rotor blade inner wall.

* * * * *